US012354219B1

(12) United States Patent
Wells et al.

(10) Patent No.: US 12,354,219 B1
(45) Date of Patent: Jul. 8, 2025

(54) METHOD OF CREATING A MEASURABLE THREE-DIMENSIONAL VIRTUAL MODEL

(71) Applicant: National Carwash Solutions, Inc., Grimes, IA (US)

(72) Inventors: Shane Lee Wells, Aurora, CO (US); Erik LaPlante, Timnath, CO (US)

(73) Assignee: National Carwash Solutions, Inc., Grimes, IA (US)

( * ) Notice: Subject to any disclaimer, the term of this patent is extended or adjusted under 35 U.S.C. 154(b) by 73 days.

(21) Appl. No.: 18/114,661

(22) Filed: Feb. 27, 2023

Related U.S. Application Data

(60) Provisional application No. 63/314,231, filed on Feb. 25, 2022.

(51) Int. Cl.
*G06T 17/00* (2006.01)
(52) U.S. Cl.
CPC .......... *G06T 17/00* (2013.01); *G06T 2200/24* (2013.01)
(58) Field of Classification Search
None
See application file for complete search history.

(56) References Cited

U.S. PATENT DOCUMENTS

| 12,014,433 | B1* | 6/2024 | Pearson | G06T 19/006 |
|---|---|---|---|---|
| 2008/0112610 | A1* | 5/2008 | Israelsen | G06T 17/00 |
| | | | | 382/154 |
| 2012/0240959 | A1* | 9/2012 | Harter | F16P 7/00 |
| | | | | 134/18 |
| 2012/0296609 | A1* | 11/2012 | Khan | G06T 19/00 |
| | | | | 703/1 |
| 2021/0334538 | A1* | 10/2021 | Marotta | G01S 17/89 |

* cited by examiner

*Primary Examiner* — Frank S Chen
(74) *Attorney, Agent, or Firm* — Nyemaster Goode P.C.

(57) ABSTRACT

A method of creating a three-dimensional, measurable, virtual model of a facility including taking first and second 360-degree scans at different locations of the facility using both a visual camera and a LIDAR instrument, saving the first and second 360-degree scans on a data storage unit of a portable computing device, creating first and second images and first and second point clouds on the portable computing device from the first and second 360-degree scans and coupling point clouds with the images. The first and second images are coupled with the first- and second-point clouds by manually manipulating overlapping portions of the first and second images on the portable computing device to create a combined image. The combined image is coupled with the first and second point clouds to create a measurable three-dimensional model and stored in an electronic storage device accessible from a remote location.

20 Claims, 6 Drawing Sheets

METHOD OF CREATING A MEASURABLE THREE-DIMENSIONAL VIRTUAL MODEL

CROSS-REFERENCE TO RELATED APPLICATION(S)

This application claims priority to and benefit from U.S. Provisional Application No. 63/314,231, filed on Feb. 25, 2022, entitled "METHOD OF CREATING A MEASURABLE THREE-DIMENSIONAL VIRTUAL MODEL," the entire disclosure of which is hereby incorporated herein by reference.

BACKGROUND

With the proliferation and expansion of business interests that include brick and mortar installations comes a need to efficiently inspect and maintain varying locations within a growing organization. These inspections typically include physical inspections on site by a person or a team of people who review the current state of the facility and inspect for status of current equipment, potential modernization or remodeling opportunities, and facility growth. The physical inspections may be costly, time consuming, and require the facility to shut down during the inspection. The physical inspections are also often time consuming and require multiple visits to the same facility if all pertinent measurements or other observations are not made. The inspections also often need to be made by people with unique skills and backgrounds where their time is short and hard to reschedule, which also results in long delays.

SUMMARY

One aspect of the present disclosure includes a method of creating a three-dimensional, measurable, virtual model of a facility including taking first and second 360-degree scans at different locations of the facility using both a visual camera and a LIDAR instrument, saving the first and second 360-degree scans on a data storage unit of a portable computing device, creating first and second images and a first point cloud and a second point clouds on the portable computing device from the first and second 360-degree scans and coupling point clouds with the images. The first and second images are coupled with the first point cloud and the second point clouds by manually manipulating overlapping portions of the first and second images on the portable computing device to create a combined image. The combined image is coupled with the first point cloud and the second point cloud to create a measurable three-dimensional model and stored in an electronic storage device accessible from a remote location.

Another aspect of the present disclosure includes a method of creating a remotely viewable and measurable virtual model, including taking a first 360-degree scan at a first location using a visual camera and a LIDAR instrument, taking a second 360-degree scan at a second location that is different than the first location using the visual camera and the LIDAR instrument, saving the first and second 360-degree scans on a data storage unit having a user interface configured to be manipulated by a user, displaying on the user interface first and second images created based on an amount of data gathered by the visual camera during the first and second 360-degree scans, creating first and second point clouds on the data storage unit from the first and second 360-degree scans and coupling the first and second point clouds with the first and second images, coupling the first and second images and the first and second point clouds by manually manipulating overlapping portions of the visual portions of the first and second images on the user interface to create a combined image, coupling the visual portions of the combined image with the first and second point clouds to create a viewable and measurable virtual model, and storing the viewable and measurable virtual model in an electronic storage device accessible from a remote location.

Yet another aspect of the present disclosure is generally directed to a method of analyzing and planning a remodeling, a reconstruction, a construction of a facility, surveying a facility for repair or replacement of a party or safety concerns, or planning a replacement of a piece of machinery associated with a facility (the facility typically being a vehicle cleaning facility and the machinery typically being vehicle cleaning machinery and systems) that includes the steps of: conducting LIDAR scans and photographic imaging at a plurality of locations within a facility using a LIDAR scanner and photographic imaging device wherein the plurality of locations are of a sufficient number to scan and provide imaging of an entire facility with the optional exception of any office space within the facility; compiling the LIDAR scan and photographic images such that the scans at each location overlap with one another to create a master virtual replication of the facility that includes both a LIDAR data set and a visual image associate therewith and thereby create a plurality of mater visual replications for a given facility; viewing and observing at least one of the plurality of master visual replications to do one of the following: plan a new interior layout for a facility; determine if a given surface area or volume of the facility is sufficient to receive a new piece of equipment; determine if an existing piece of equipment is installed correctly and correctly positioned; plan a proposed revised layout and reconstruction plan for the facility by placing representations of new equipment into the space and reviewing utilities available at the facility and that may be needed to be added; or review the existing equipment to determine what part is needed prior to dispatching a repair person to the site; and remodeling the facility based on the plurality of master visual replications; reconstructing the facility based on the plurality of mater visual replications; providing safety inspections and changes based on the plurality of master visual replications; of replacing a piece of machinery within the facilities based on the plurality of master visual replications.

These and other aspects, objects, and features of the present invention will be understood and appreciated by those skilled in the art upon studying the following specification, claims, and appended drawings.

DETAILED DESCRIPTION

Figure 1:
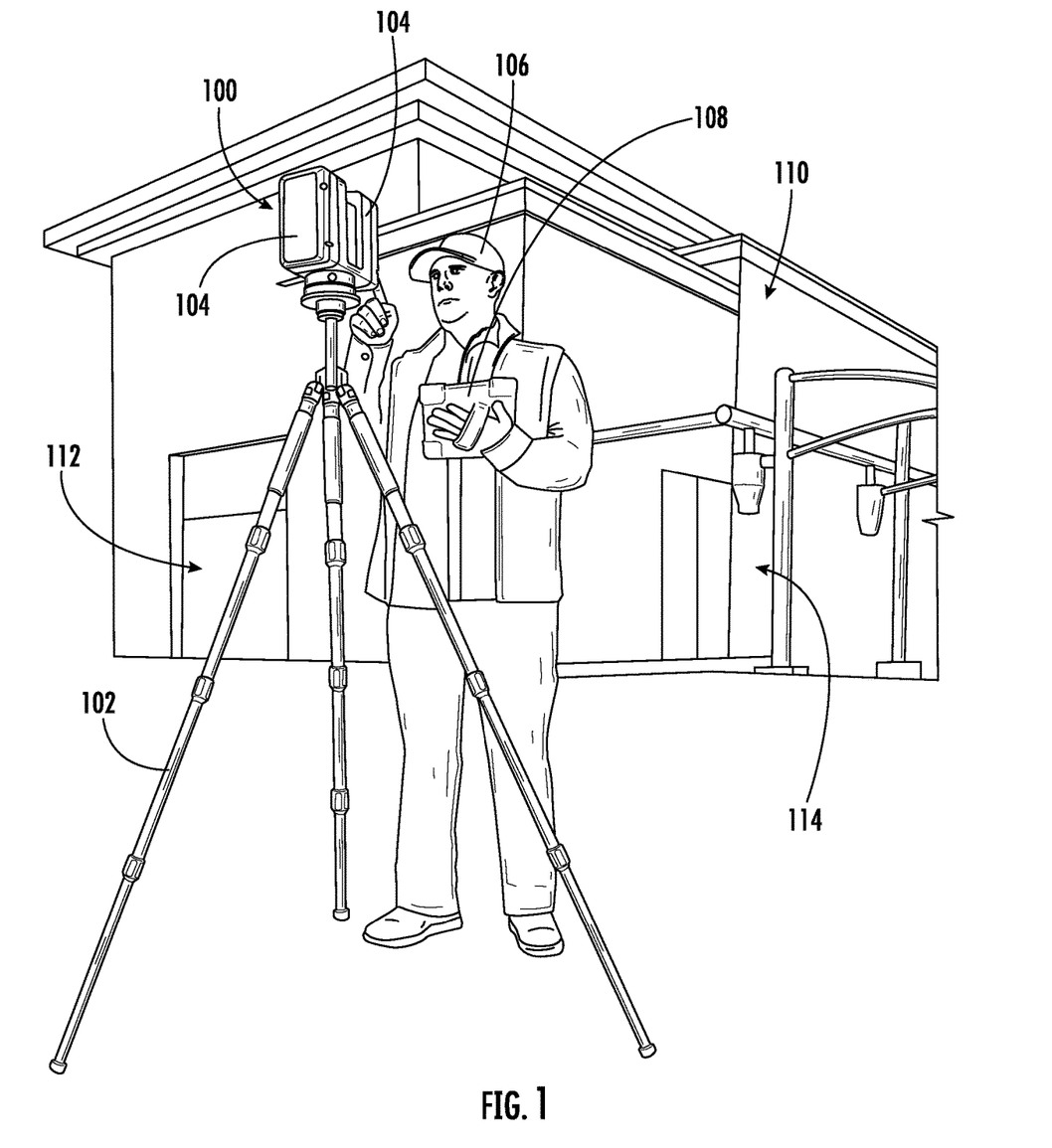
FIG. 1 is a photo of a user with a combined visual camera and LIDAR instrument scanning system mounted on a tripod.

For purposes of description herein related to the stationary, but moveable, mounted LIDAR and visual image capturing system, the terms "upper," "lower," "right," "left," "rear," "front," "vertical," "horizontal," and derivatives thereof shall relate to the disclosed embodiment shown and as oriented in FIG. 1. However, it is to be understood that the invention of the present disclosure may assume various alternative orientations, except where expressly specified to the contrary. It is also to be understood that the specific devices and processes illustrated in the attached drawings, and described in the following specification are simply exemplary embodiments of the inventive concepts defined in the appended exemplary claims. Hence, specific dimensions and other physical characteristics relating to the embodiments disclosed herein are not to be considered as limiting, unless the claims expressly state otherwise.

An aspect of the present disclosure is generally directed to an overall system used to visually scan and scan using a LIDAR system a building structure, typically an industrial or commercial facility or possibly a retail facility, but most typically a vehicle cleaning facility that allows for washing a vehicle or vehicles and optionally drying the cleaned vehicles. Even more typically the overall system is used to visually scan and scan using a LIDAR system the interior sections of a vehicle cleaning facility, more typically both the interior portion of the building that treats the vehicles within the vehicle cleaning facility, but also the separate rooms where vehicles are not present but that contain systems used to clean vehicles such as chemical storage and dispensing rooms having dispensing systems operably and fluidly connected to the vehicle washing systems within the facility. The systems of the present disclosure typically include a computer system that receives, either directly via a wired connection or wirelessly via a WIFI® or cellular signal communication network, a plurality of images taken at a variety of locations within and optionally outside a facility. The computer systems of the systems of the present disclosure may store the image data remotely in a cloud server system that is then accessed from any of one or a plurality of remotely located local client computer systems that access the same image data for a given scanned facility.

A distributed computer network is an example of an aspect of the present disclosure. Those skilled in the art will recognize other modifications, modifications, and alternatives. For example, two or more cloud-based server systems may be connected to the communication network as discussed above. A plurality of client computer systems may be coupled to the communication network via an access provider (not shown) or via some other server system.

Client computer systems typically request information from the cloud server system(s) that provides the information via a wireless (cellular and/or WIFI® network) and/or a hard-wired signal transmission system. The cloud server system(s) typically have more computing and storage capacity than client systems and are located remotely from the client systems. However, a particular computer system may conceivably act as both a client and a server, depending on whether the computer system requests or provides information. In addition, although aspects of the present disclosure have been described using a client-server environment, it should be clear that the disclosure can also be embodied in stand-alone computer systems.

The cloud server is typically responsible for receiving information requests from the client systems, performing the processing required to satisfy the request, and sending the result corresponding to the request back to the requesting client system. The processing required to satisfy the request may be performed by the cloud server system or may be delegated to another server connected to the communication network instead. Of course, a single computer system may be used to process the images received using the systems of the present disclosure.

Client systems typically allow users to access and query information stored by the cloud server system. In one particular embodiment, the local client system can operate as a desktop application or a stand-alone application such as a mobile smartphone or tablet application where the mobile smartphone or table have a touch sensitive display. In another aspect of the present disclosure, a "web browser" application running or dedicated program application residing on a client system allows a user to select, access, retrieve, or query information stored by server system 122. to enable. Examples of web browsers are provided by the Microsoft Edge browser program provided by Microsoft Corporation, the Firefox® browser provided by Mozilla, and Google. Includes Chrome browser, Safari browser provided by Apple, and more.

In a client-server environment, some resources (e.g. files, photographs, video, or data) are stored on the client, while other resources are stored or are stored somewhere else in the network, such as the cloud server. Delivered from and accessible via a network (e.g. the Internet). Therefore, the user's data can be stored on the network or in the "cloud". For example, a user can work on a visual output graphical interface of the present disclosure on a client device that is stored remotely in the cloud (e.g., a server). Data on client devices can be synchronized with the cloud or stored on the cloud.

An exemplary client or server system of the present disclosure typically includes a plurality of user interfaces with the system through a computer workstation system as exemplary shown in FIGS. 2, 3, 4, and 6. The local computer systems used to access the images and image analyzing software systems of the present disclosure typically include a monitor or other display screen, a housing (which may also be referred to as a system unit, cabinet, or case), a keyboard or other human input device, and a mouse or other pointing device or other user input device. The mouse may have one or more buttons, such as the mouse button. Of course, a touch sensitive display, if used in connection with a smartphone or tablet or local computer system such as a laptop computer may receive user input from the user's finger(s) instead of via a keyboard and mouse.

The visual and LIDAR composite images of the present disclosure, as shown in FIG. 1, are typically taken by assessing a remote facility at a given time that the property or facility is available. Typically, the facility is either a new facility or a facility that is five (5) or more years old or at least contains one or more vehicle cleaning systems inside and/or outside the facility that the owner wants to evaluate for safety, for upgrading the equipment and/or for maintenance of the existing equipment. The images are taken and compiled together to essentially create a three-dimensional, LIDAR scanned and 360 degree visually photographed composite view at a plurality of locations. Typically, a given facility is scanned once and then does not need to be scanned again for at least a plurality of months, more typically after a plurality of years or at a predetermined interval (sometimes a term defined by when a safety review is to be conducted according to governmental regulation or before a governmental review of the facility).

The scanning systems of the present disclosure involves imaging using both a visible light camera and a light imaging detection and ranging (LIDAR) instrument such as that shown in FIG. 1. The LIDAR instrument 100 is typically mounted stationary in the context of the present disclosure on a tripod 102 or similar device, but can also be mounted to an established consistent location in the facility itself if at an appropriate height and locations. The LIDAR device typically has a 360-degree scanning system or at least two housings 104 on opposing sides of the system to allow for a 360-degree scan or a substantially 360-degree scan to be made.

The LIDAR system may be a pulsed time-of-flight (ToF) system in which the time it takes a pulse of light to reach, bounce off, and return to the laser emitter is measured and used to determine the distance to the reflected object. However, it should be known by one of ordinary skill that other types of LIDAR may be utilized without deviating from the scope of the disclosure, including triangulation-type LIDAR in which distance or position is determined by comparing the geometries of similar triangles using position and image sensors, or any other type of LIDAR known in the art.

In FIG. 1, the user 106 is shown setting up the system outside of a vehicle washing structure 110 and is using a mobile touch screen enabled tablet 108 computing system to control the scanning systems and receive the data from the scans. The LIDAR scan is typically set at a level of about 4 to about 7 feet above the surface/floor. The system in FIG. 1 is shown being used on an exterior of a vehicle washing facility, which it can be used in connection with, for example, when used to scan the layout of a vehicle vacuuming portion 114 of the overall facility, which is typically located outside the vehicle tunnel washing facility 112. However, the system is more typically used in connection with various scanning locations within a potential vehicle washing facility to determine the feasibility (typically both logistically and economically) to create or refurbish the facility. A vacuuming portion 114 typically has a central vacuum or canister vacuuming system(s) to enable one or more often a plurality of vehicles to be vacuumed simultaneously.

The LIDAR system is positioned at a variety of locations within the facility to be analyzed and scans undertaken at each location (as well as 360-degree traditional photography). The scan and the photography may be taken at the same time by an integrated unit or by separate scanning systems. The computer systems typically overlay the images based on comparative analysis of the images to make sure the visual image and the LIDAR images created are mapped onto one another accurately. The LIDAR sensor emits pulsed light waves into the surrounding environment. These pulses bounce off surrounding objects and are returned to the sensor. The sensor(s) use the time it takes for each pulse to return to the sensor to calculate the precise distance it traveled. This process is repeated millions of times per second to create a precise real-time three-dimensional map of the environment from that particular location. The onboard computer to the LIDAR system or a remotely located system is further used to analyze the resultant images.

The output from each of the camera and the LIDAR instrument are then typically combined to form a remotely viewable and measurable output. Mostly typically visual images and LIDAR images are taken at a variety of locations shown as a dot on the image in FIG. 2. Each of these locations may be selected by a user who may be the same or different than the user who conducted the initial scan. These same locations may be precisely captured for future scans if the entire facility is to be scanned again, for example, after a period of time has passed for further safety inspection or after a refurbishment of the facility or after installation of new equipment or machines occurs. This creates a consistent analysis/consistent views for the user over time of the facility when done. Of course, the scanning would not have to take place at the exact same locations within a remodeled facility but could be selected at new location such that the scanning obtains accurate imaging of the relevant portion(s) (typically the entire interior of the facility excluding office space) of the facility often the scan of the facility using the LIDAR systems of the present disclosure may be done by user's that are not health and safety professionals or maintenance experts, but could be people with those qualifications. An advantage of the systems of the present disclosure is that the systems allow for LIDAR trained users to create scans at a different time from those users who may use and evaluate the scans. The systems also allow for more efficient use of the time of highly trained inspectors for maintenance and/or safety personnel who can review the scanned images and information remotely and at a later time or times than when the actual scan was taken and even further allow multiple experts to consult with other highly trained personnel, for example, over the internet video conference systems or through the systems of the present disclosure themselves by allowing simultaneous viewing of the data at multiple different computing systems located remote from the facility by multiple different people.

Figure 6:
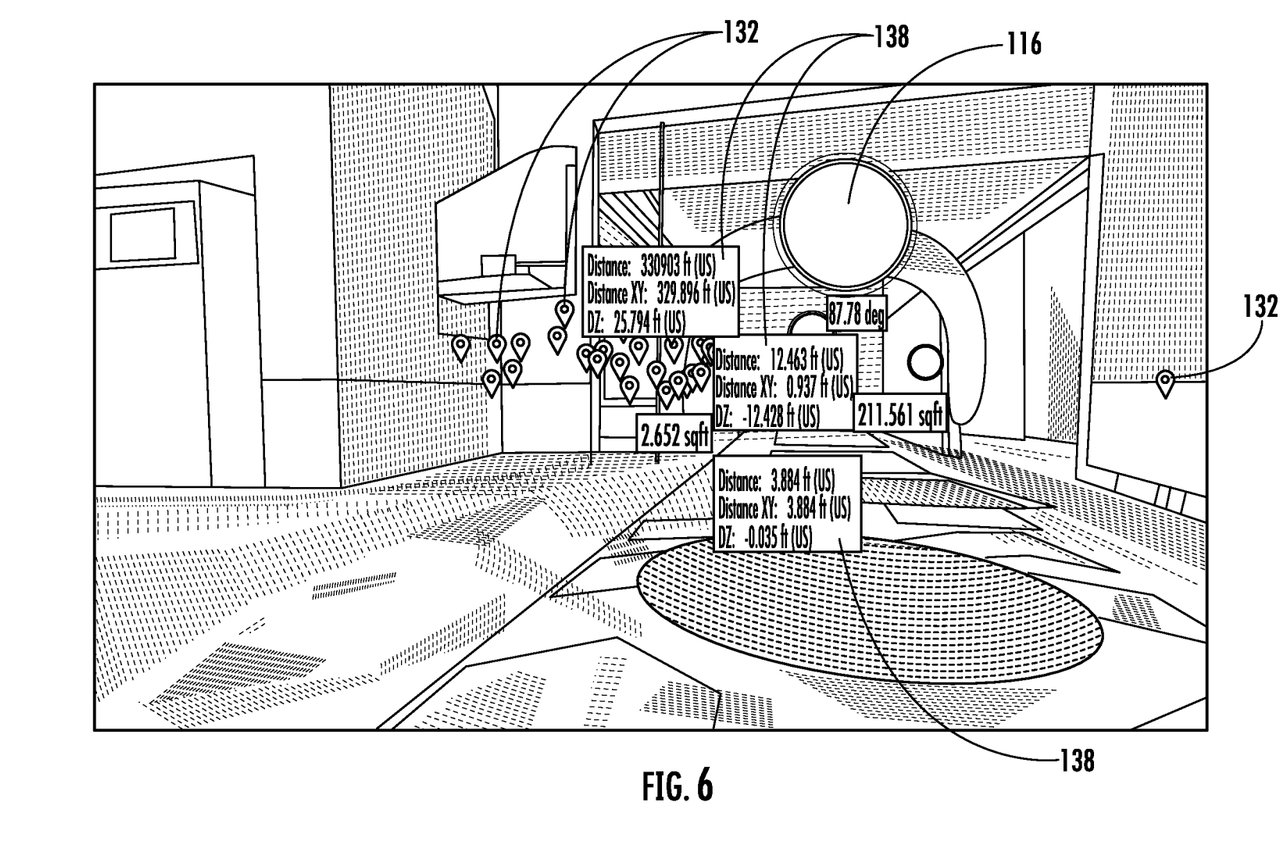
FIG. 6 is a sample graphic user interface display of a measurable three-dimensional model of a facility showing examples of measurements overlaid on the screen.

A user at a geographic location away from and different from the facility can use the compiled scans taken before the user at the geographical location accesses the compiled scans to (1) review the exterior condition of elements within the facility using primarily or exclusively the visible light scan; and (2) determine extremely accurate distance measurements using the LIDAR scan output. The user may be a maintenance professional that normally would not be able to readily access the facility due to the remote location from the maintenance or safety profession being so far from the facility. The systems of the present disclosure allow users with very specialized expertise to review significantly more facilities than they otherwise would be able to review in the same amount of time. This reduces maintenance down time, allows for proactive maintenance, and allows for the identification of potential safety risks prior to any accident occurring at the facility. As shown in FIG. 6, the distance along any surface that has been scanned may be determined by clicking or selecting one location on the image of a graphical user interface and dragging the line or otherwise selecting the end location of the distance to be measured within the scan or the composite scans from more than one location. When this occurs, details of the locations selected and/or the distance measured may appear in dialogue box 138. The dialogue box typically shows the distance between the points as well as the 3-dimensional components of the total distance (x-y-z distances).

The details described below may relate to a carwash facility and the elements included within the car wash facility, but it should be known that the elements and processes may be used in any number of other facilities such as distribution centers or manufacturing facilities such as vehicle manufacturing lines/systems or farming equipment lines/systems. If live visual cameras are used and permanently mounted to the locations within the facility the system could be used to provide live or essentially live real time monitoring of equipment and/or people within the facility and provide for proactive assistance and maintenance to people and equipment in the facility by providing both distances and live images. The distances between structural features would be derived in each instance from the one or more LIDAR scans and the photos or videos overlaid the one or more LIDAR scan—in essentially real time if the LIDAR scan is coupled with video surveillance. The system helps those reviewing the scanned images provide safety review from trained safety professionals for a particular industry to review a facility more quickly and inexpensively by allowing an inspector specifically trained in the particular type of facility or industry to review more facilities In use, a user, typically a surveyor, may arrive on site and assess the location or the facility for the most efficient approach to scanning the functional portions of a facility. Typically, the office areas of a facility such as a carwash facility may not be included as part of the functional portions of the facility. The surveyor prepares a property layout for the scanning process like that shown in FIG. 2. Once this has been established the user then sets up a LIDAR surveying camera like shown in FIG. 1 in position number one and connects the camera to a portable computing device having data manipulating software embedding on it.

In some aspects of the present disclosure, the amount of data during the multiple scans of a facility may be extremely high, and an external data storage device may be connected to the portable computing device to offload data from the portable computing device to the external data storage. In still other embodiments, the portable computing device may include large enough data storage that the portable computing device itself may operate as the external storage device.

When the cameras of the system of the present disclosure are initialized, the LIDAR and visual camera begin taking pictures and recording location data. The camera and LIDAR instrument are spun in a 360-degree rotation to take pictures and data all around the camera, and one rotation may take about two minutes, or two minutes or more. The LIDAR instrument scans at least about two million locations points per second. The LIDAR scanning portion of the system is typically a system that passes eye-safety standards.

The number of laser beams or lines used in the LIDAR system can range from 8 to 128 beams or lines. This system typically uses LIDAR scans with lower amounts of beams since the scans are typically taken of static objects instead of objects that are moving relative to the scanner as is case when such systems are used to help with automated vehicles or equipment such as forklifts. The higher resolution systems can, of course, be used when greater detail on the scans of the facility are needed or desired. The wavelength of the LIDAR laser lights can vary, but are typically in the range of from 905 nm to 1550 nm, which are generally considered safe and meet Food and Drug Administration (FDA) eye safety standards. Higher power/wavelength systems however consume more power and are not typically used for multiple static scans as contemplated in the case of the systems of the present disclosure simply due to the use of mobile battery systems to power the cameras and systems of the present disclosure while the scanning process is occurring.

Once position number one has been scanned the radar surveying camera is then moved to a subsequent position, position number two, and the process is repeated until all of the locations from the initial survey have been scanned. The portable computing device includes software to analyze and process the raw data from the visual camera and the LIDAR instrument and prepare composite images of the interior and optionally also the exterior of the facility either from ground level or via a drone scan. This software allows the user to visualize each scan as they are taken, aligning the visual images and attaching files in real-time as the scans are completed.

Figure 2:
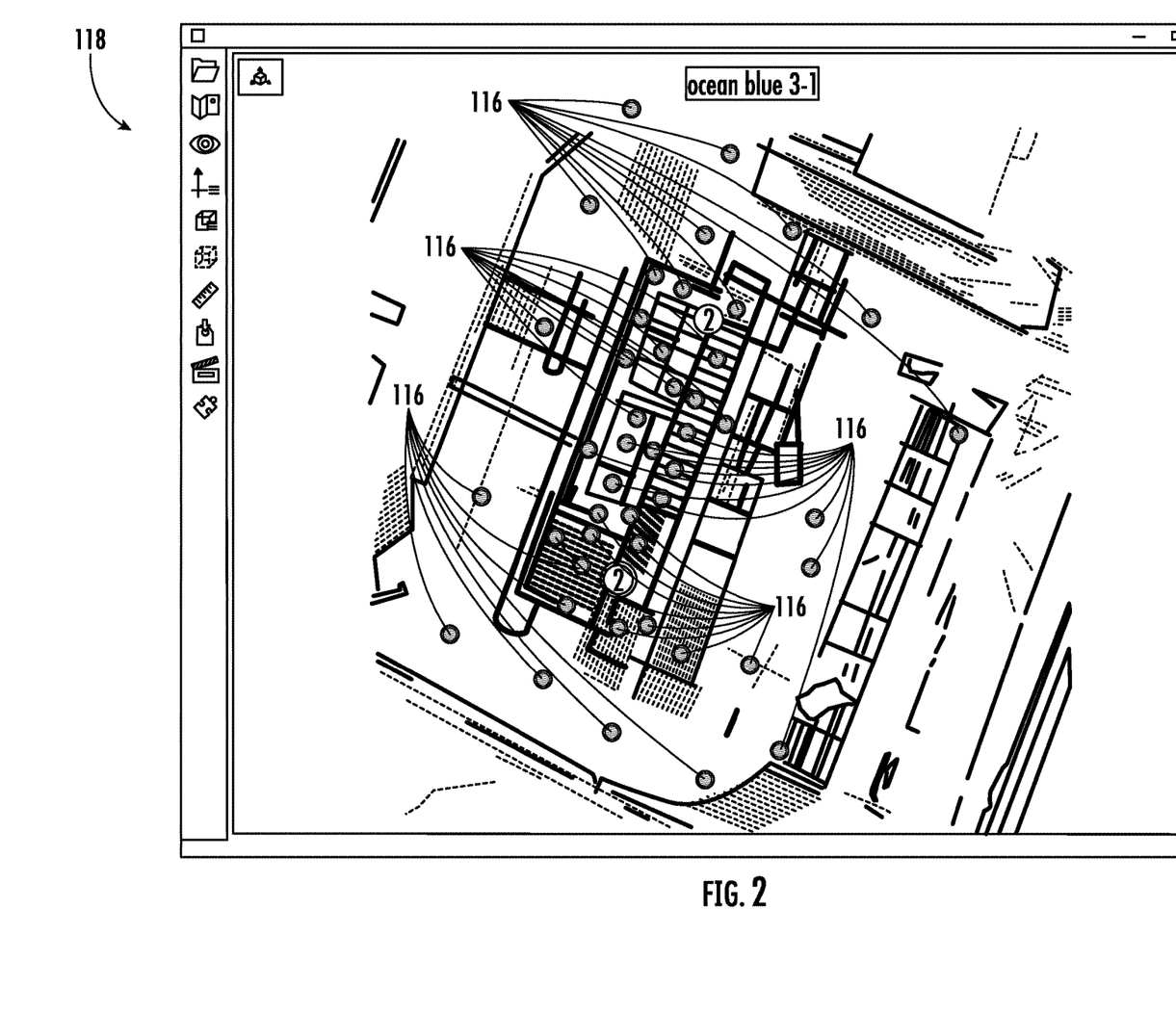
FIG. 2 is an overall composite LIDAR scan of a facility layout showing the actual locations of the systems, machines, systems and layout of the facility showing a variety of locations using the combined visual camera and LIDAR scanning system.

FIG. 2 shows a top view LIDAR scan image 118 of a facility. Images of this type may be generated from either or both of an overhead drone LIDAR scan(s) of the facility (See FIG. 5 as well) and the exterior of the facility and grounds and/or a composite analysis of the numerous scans taken within the interior of the facility. Each of the "dots" 116 in FIG. 2 represent a location where one or more scans of either or both of a LIDAR and/or visual photograph or video image was taken and processed into the image for later use and analysis. This image/graphic user interface is essentially a map with selectable locations to view the location and status of the equipment at a given location. Each "dot" 116 or other visual indicator may be selected by a user after the scanning has been completed and a review and analysis of the location selected undertaken for any purpose, but most typically for review of the systems for maintenance, safety, refurbishment or construction.

Figure 3:
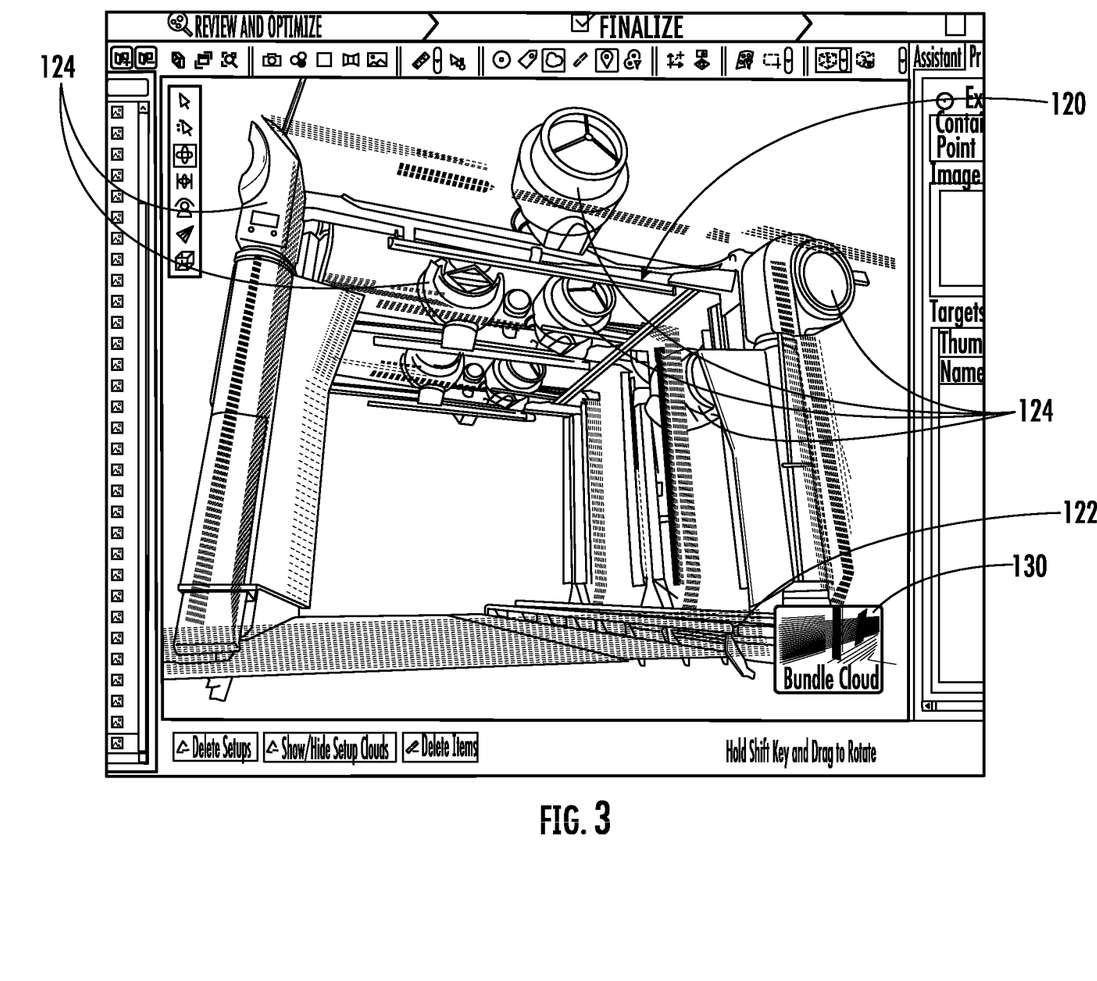
FIG. 3 is an exemplary, computer-generated graphical user interface representation of a point cloud of a dryer system of a carwash facility.

For example, a user may select the location near a main vehicle washing assembly 122 and see the LIDAR image of an overall dryer system 120 as shown in FIG. 3. This then enables the user to take measurements due to the accuracy of the LIDAR image and determine a replacement perhaps newer or faster or better system may be installed in the same physical location and determine if the existing infrastructure within the facility is sufficient to accommodate the system. In this case, perhaps water supply and drainage as well as the conveyor system 122 type and length. One can also remotely review the specific type of subsystems such as the blowers/fans 124 of the system to determine if improved systems may be installed on the existing system and/or if the subsystem(s) are installed correctly for optimal performance. One can also remotely observe if the system is overall installed correctly for optimal performance.

Figure 4:
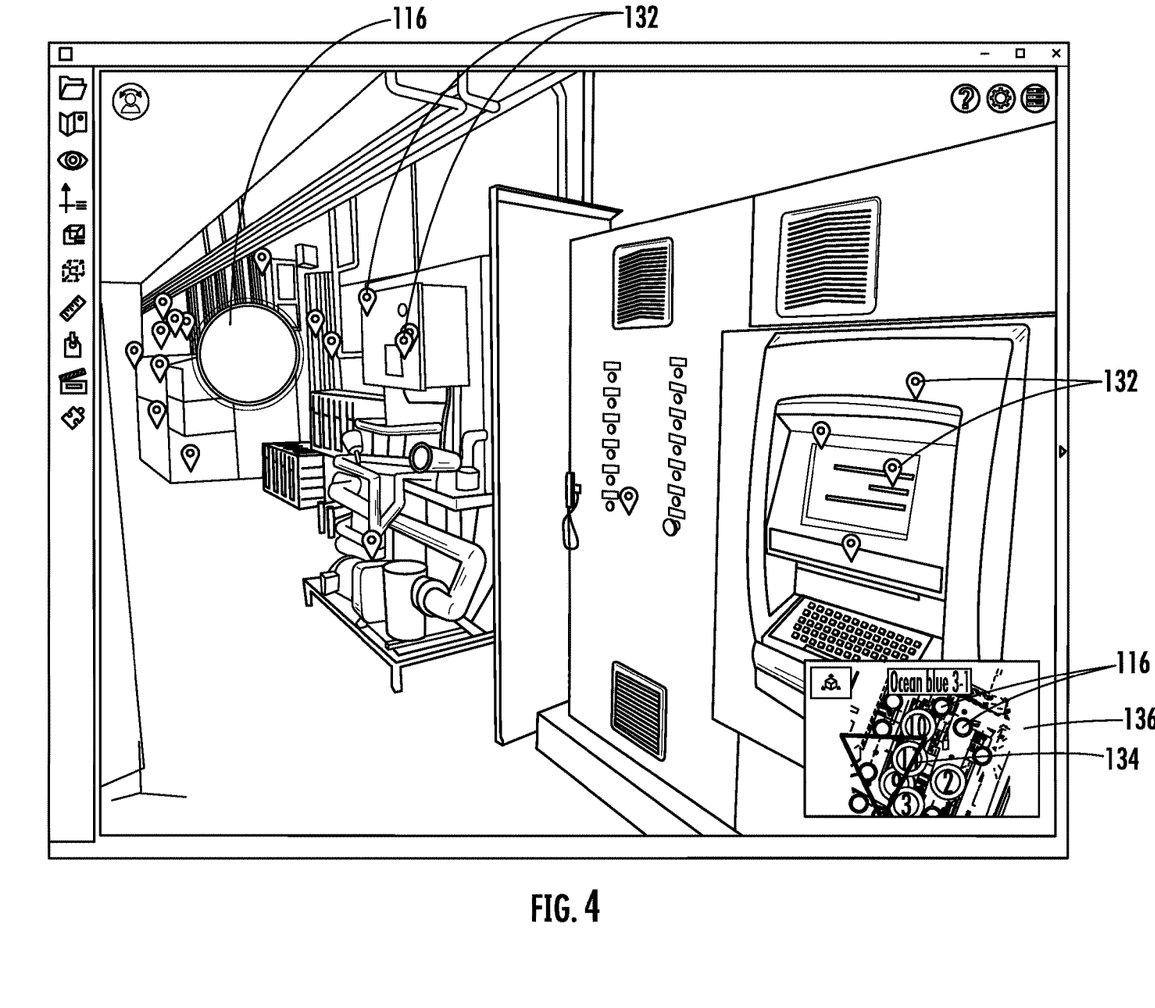
FIG. 4 is an overall exemplary graphic user interface image showing scanning locations in a smaller screen, which highlights the portion of the overall facility shown in the larger, exemplary and asset tags of a measurable three-dimensional model.

By way of the example shown in FIG. 4 the user may align common overlapping images from location two (image shown) over portions of the image from location one (taken at the location bubble adjacent in FIG. 4) to align them within the software. In this way a user that is on-site and conducting the survey can accomplish the alignment necessary by aligning the visual data from two different scans while the software uses the visual alignment to simultaneously align the point clouds as well, thereby using the software to build up an overall model of the facility.

Also shown in FIG. 4, a user may attach component data to certain elements found within the scans. As detailed below, much data may be stored and updated regarding the component such as useful life, cost to replace, cost of maintenance, size, weight, and any other data deemed desirable for the particular facility. The software may implement artificial intelligence (AI) to automatically recognize various components based on the user's identification of certain point cloud configurations to implement and improve the automatic recognition of components over time.

The components of the facility may be identified using individual location markers 132 throughout the view within the computer graphical user interface created by the composite of the various types and different locations of the scans can be labeled for review by another individual or the initial reviewer at a latter time. The markers may be automatically added with or without data by the system or may be added manually by a user. The markers 132 can also be used to tag specific models of equipment for ease of reference by a maintenance personnel that may not know such information without having to look the information up in another source.

In this manner, information like model number, serial number, and even perhaps purchase price and date and invoicing information or any other information related to the device/system or subsystem identified and conceivably even what resources, such as water or electricity and their amount that are necessary to allow efficient operation of the device/system or subsystem. The graphical user interface of the system(s) of the present disclosure also typically have a sub-window 136 that shows the overall scan and the view being seen in the larger view of the graphical user interface.

Figure 5:
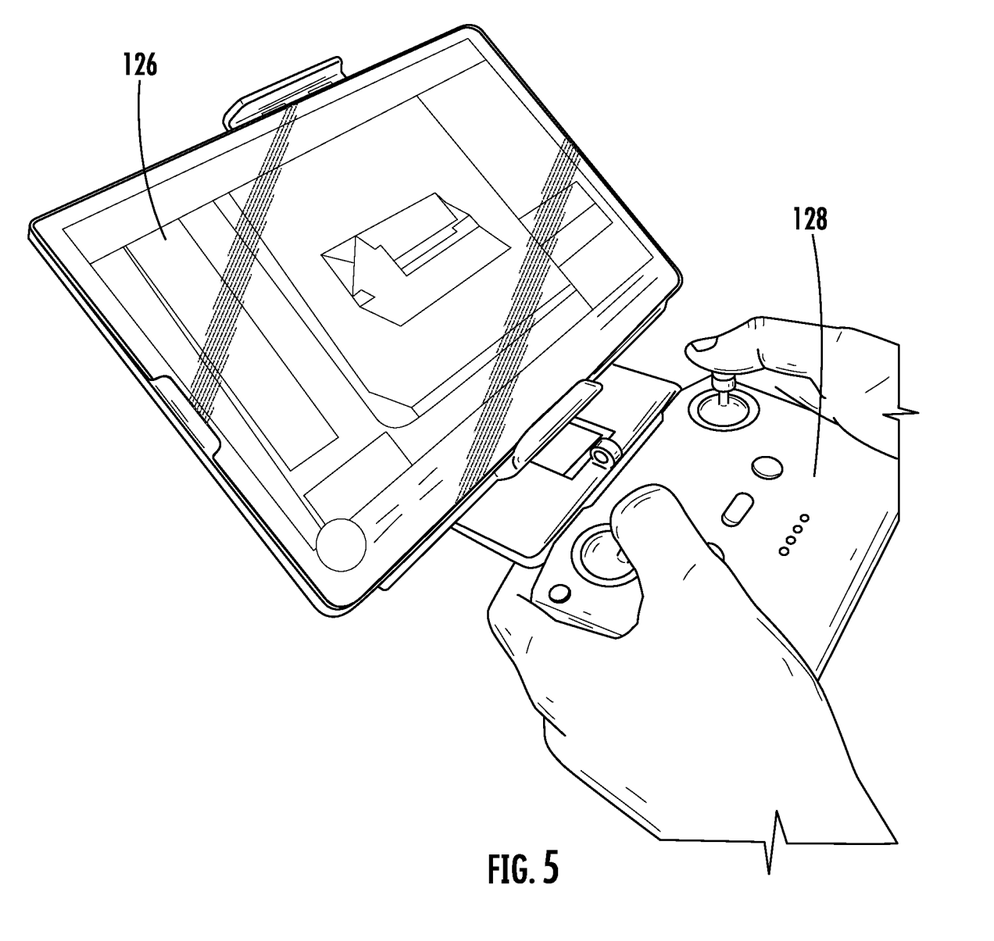
FIG. 5 is an image showing a portable computing device with a drone controller used in conjunction with one or more camera systems on the drone and optionally a LIDAR system mounted thereon so that when the drown is flown over or within a given facility it takes images of and records the exterior perimeter of the facility and provides details of the entire property the facility is located on and also is able to scan the layout of any systems located outside an interior of a facility such as, in the case of a vehicle washing facility, an exteriorly located vacuuming system and associated vehicle locations.

In an embodiment, a drone with a camera may be coupled with or used in conjunction with the system to provide a birds-eye view of the property that is able to be reviewed remotely and distances accurately measured. The user may use an external data storage unit and computing device like a touchscreen tablet 126 in conjunction with a drone controller 128 as shown in FIG. 5 to move the drone and camera (not shown) into desired positions and take overall visual photos of the property, and then combine with the LIDAR data as described above. The tablet and the drone are typically in signal communication with one another. The exterior scan and review of the overall property and enclosed building structures and other assets present on the site and provide the reviewer the ability to propose physical changes to the structure and layout of not just the interior of the existing structure, but to also propose and plan expansions of the facility and/or change the vehicle flow path or exterior features like vacuuming bays and systems and lighting systems.

Each scan of the LIDAR instrument expands the view created in the software by as much as 450 feet. As discussed above, a laser is emitted from the instrument and returns after bouncing off of an object which records the speed and distance of the beam. This is known as a point in the cloud and as these points are generated in mass it is known as a point cloud. A point cloud is created around all elements within sight of the LIDAR instrument, along with the specific locations of the points in an x-y-z location framework. This allows a remote user using the software on the local or remote cloud server to later find distances between elements within the field of the scan that are shown from the visible camera output after the software has coordinated the visible data with the LIDAR data.

In order to capture all surfaces of an object the camera must be placed so that all surfaces are visible during at least one of the scans. It is also encouraged to make each scan have overlapping surfaces that may be registered so the individual scans can have common points of reference for stitching together by the software in a digital space. A typical location may require between 20 and 50 scan locations (shown in FIG. 2 as dots 116) to capture the entire facility's interior. The areas included in a carwash facility include but may not be limited to the wash bay, facility offices, vacuum stalls, pay kiosks, and an equipment room. As mentioned, sometimes facility offices may be excluded form the scan, but this is not typically the case. A complete picture of the facility for later use is typically preferred and typically does not add significant costs.

It may be necessary in the initial survey to include survey positions close to any critical assets within the facility that may be attached inside the scan for geo-location. Camera placement in front of each critical asset may be planned so that the resolution of the point cloud is high density at these critical assets in conjunction with high resolution JPEG photos. As shown in FIG. 3, a dryer system 120 may be deemed a critical asset, and one of the locations represented by a "dot" 116 or other visual indicator on the graphical user interface may be placed very close to the dryer in order to get very high-resolution points clouds associated with the different elements of the dryer system within the file. Similarly, facility assets may be tagged with asset tags as shown in FIG. 4 to make it easy for the user to search and find the location of desired assets and visually see the orientation and status of the asset as well as overlay a facility map to see the location of the asset within the overall scope of the property.

The photos are combined digitally with the point cloud (shown in a box 130 in FIG. 3) to give an augmented reality appearance in the digital space such as shown in FIG. 6. After each scan is complete, the files are recorded to an internal jump drive/removable memory storage device such as a removable USB or USB-C device and also typically viewed on the portable electronic device (typically a touch sensitive mobile computing device (tablet or smartphone or laptop computing device) for alignment, or placement optimization. The camera is then moved to the next position and the process continues until the scanning of all or a portion of the facility is completed. Again, typically the entire interior and often the entire interior and exterior of the facility is scanned.

The point cloud generated from the scans typically requires several hours of software production time to produce a finished product after the on-site user or surveyor has left the site. It is then uploaded into the cloud server systems of the overall systems of the present disclosure where various remote teams, client representatives, or one or more subject matter experts such as safety experts as discussed above can view, analyze, and otherwise use the data. Maintenance personnel, maintenance experts, and/or manufacturing efficiency experts can review the scanned images prior to departing to service a critical asset or other device(s) on site as well or make recommended changes to the systems to make them more efficient. This prevents duplicate travel due to traveling to a location with incompatible or missing replacement parts. While not limited to these uses, remote users may utilize these materials for the purpose of constructing a project, conducting operations, working with service providers, or reviewing asset utilization and efficiency for the location specified. The remote user may use a "virtual measuring tape" to measure distances using the combined LIDAR point cloud location data and the visual images as shown in FIG. 6. As discussed above, this can be done accurately by the user selecting a starting location and subsequently selecting the ending location for measurement. The data may also be used to present 2-dimensional and 3-dimensional measurements to allow the user to access square footage and volume information about different spaces.

Examples of uses for the facility "digital twin" for use by the remote user include but are not limited to: portfolio asset management (DAM-Data Asset Management); data import into three dimensional architectural, engineering and equipment drawings. Clash detection is the technique of identifying if, where or how design aspects will interfere with each other; as Built Construction Documentation; asset replacement consideration for construction, dimensions, installation; risk assessment, Insurance policy optimization & Occupational Safety and Health Administration (OSHA) compliance; multi-site portfolio management for branding, marketing and site considerations; bank valuation, release of funding, documentation accuracy, trade accountability; and remote viewing for service technician planning for efficiency and parts allocation as well as remote tech support.

In addition to the LIDAR and visual image data, the modeling system may also include utility maps combined with the LIDAR data and/or the visual image data (still images or video). When used in conjunction with the visual and LIDAR data, the utility mapping allows for a user to virtually fly through walls and see exactly where the electrical, plumbing, network wiring, or any other utility routing may be located. In this way the user may plan expansions or renovations of the facility and get a very detailed view of any potential re-routing of utilities such as electrical and network wiring and plumbing that will be required.

In the specific use case of a carwash facility, internal sensors such as pressure sensors at strategic points within the plumbing or voltage sensors at strategic points within the electrical system may be used with the utility mapping to find trouble spots within the entire electrical or plumbing system of the carwash facility. The sensors may be coupled with the modeling system such that real-time sensor information may be overlaid with the existing visual and LIDAR data to form an easy to see map of the functioning of certain assets.

As discussed elsewhere herein, each property, facility, or site, which is typically a vehicle wash property, facility or site, may require from 20-50 scans to make a complete scan of the overall property, facility or site. This typically results in up to 30 GB of data that requires storage, restricted access for viewing only by selected parties, and a management system. Each surveyor can typically accomplish scanning up to two locations (large sites) and up to five smaller automatic vehicle washing locations per day. This is the daily potential of 100 GB of data or more that is processed, uploaded, and made viewable per surveyor.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. A method of creating a three-dimensional, measurable, virtual model of a functional portion of a facility, comprising the steps of:

taking a first 360-degree scan at a first location of the facility using both a visual camera and a LIDAR instrument;

taking a second 360-degree scan at a second location of the facility that is different than the first location using the visual camera and the LIDAR instrument;

saving the first and second 360-degree scans on a data storage unit of a portable computing device;

creating a first image and a second image each having visual portions thereof on the portable computing device from the first 360-degree scan and the second 360-degree scan;

creating a first point cloud and a second point cloud on the portable computing device from the first and second 360-degree scans and coupling the first point cloud and the second point cloud with the first image and the second image;

coupling the first and second images and the first point cloud and the second point cloud by manually manipulating overlapping portions of the visual portions of the first and second images on the portable computing device to create a combined image;

coupling the visual portions of the combined image with the first point cloud and the second point cloud to create a measurable three-dimensional model;

attaching a marker to at least one component of the facility with component identification data;

storing the measurable three-dimensional model in an electronic storage device accessible from a remote location; and combining the viewable and measurable virtual model with an electronic three-dimensional utility map to create a composite map.

2. The method of claim 1, wherein the electronic storage device is accessible from a remote location by a limited predetermined list of users using a remotely located mobile computing device; and wherein the method further comprises the step of conducting maintenance of a vehicle washing machine or drying machine based upon a user's review of the measurable three-dimensional model using the remotely located mobile computing device and wherein a person creating the measurable three-dimensional model is different than a person conducting maintenance of the vehicle washing machine or drying machine.

3. The method of claim 1, wherein the measurable three-dimensional model is combined with the electronic three-dimensional utility map to create a unified three-dimensional map containing distance information, visual information and visible and hidden utility information overlaid on one another.

4. The method of claim 3, wherein the facility includes utility sensors that measure a status and an availability of at least one of utilities of the facility at a plurality of points within the utilities located within the facility and the facility is a vehicle washing facility.

5. The method of claim 4, wherein the utility sensors stream real-time sensor data to the electronic storage device and wherein the real-time sensor data is viewable within the measurable three-dimensional model.

6. The method of claim 1, wherein the LIDAR instrument utilizes line-of-sight type LIDAR and wherein the of the LIDAR are in a range of from 905 nm to 1550 nm and at least 20 scans at each scanned location within the facility are made to create the measurable three-dimensional model.

7. The method of claim 1, wherein the electronic storage device is the portable computing device and wherein the facility is a vehicle washing facility, a vehicle drying facility or a vehicle washing and drying facility.

8. The method of claim 1, wherein the component identification data comprises a component name and at least one of the following: a model number of the component, a serial number of the component, a useful life of the component, a cost to replace the component, a cost of maintenance of the component, a size of the component, and a weight of the component.

9. A method of creating a remotely viewable and measurable virtual model of a vehicle washing facility, a vehicle drying facility or a vehicle washing and drying facility, comprising the steps of:

taking a first 360-degree scan at a first location within or around the vehicle washing facility, the vehicle drying facility or the vehicle washing and drying facility using a visual camera and a LIDAR instrument;

taking a second 360-degree scan at a second location that is different than the first location using the visual camera and the LIDAR instrument;

saving the first and second 360-degree scans on a data storage unit having a user interface configured to be manipulated by a user;

displaying on the user interface a first image and a second image created based on an amount of data gathered by the visual camera during the first 360-degree scan and second 360-degree scan;

creating a first point cloud and a second point cloud on the data storage unit from the first and second 360-degree scans and coupling the first point cloud and the second point cloud with the first and second images;

coupling the first and second images and the first point cloud and the second point cloud by manipulating the overlapping portions of visual portions of the first image and the second image on the user interface to create a combined image;

coupling the visual portions of the combined image with the first point cloud and the second point cloud to create a viewable and measurable virtual model; and storing the viewable and measurable virtual model in an electronic storage device accessible from a remote location that is remote from the vehicle washing facility, the vehicle drying facility or the vehicle washing and drying facility; and conducting maintenance of a vehicle washing machine or a vehicle drying machine based upon a user's review of a measurable three-dimensional model.

10. The method of claim 9, wherein the viewable and measurable virtual model is combined with an electronic three-dimensional utility map.

11. The method of claim 10, wherein the utility map includes utility sensors at a plurality of points within utilities located within the facility.

12. The method of claim 11, wherein the utility sensors stream real-time sensor data to the electronic storage device and wherein the real-time sensor data is viewable within the measurable virtual model by remotely located users.

13. The method of claim 9, wherein the remotely viewable and measurable virtual model is of a facility having functional portions.

14. The method of claim 9, wherein the data storage unit is coupled to a portable computing device.

15. The method of claim 14, wherein the user interface is displayed to the user on the portable computing device.

16. The method of claim 9, wherein the electronic storage device is a data storage device; and wherein the step of coupling the first and second images and the first point cloud and the second point cloud by manipulating overlapping portions of visual portions of the first image and the second image on the user interface to create the combined image is done by manually manipulating the overlapping portions of visual portions of the first image and the second image on the user interface.

17. A method of analyzing a functional portion of a facility for the purpose of planning a remodeling, a reconstruction, a construction of a facility, surveying a facility for repair or replacement of a part, or planning a replacement of a piece of machinery comprising the steps of:

conducting LIDAR scans and photographic imaging at a plurality of locations within a facility having functional portions using a LIDAR scanner to create LIDAR scans and photographic imaging device to create photographic images at the same location as the LIDAR scans wherein the plurality of locations is of a sufficient number to scan and provide imaging of at least the functional portions of the facility;

compiling the LIDAR scans and photographic images to form compiled LIDAR scans such that the compiled LIDAR scans and photographic images at a given location overlap with at least one adjacent compilation of LIDAR scan and photographic images such that the overall complication of LIDAR scans and photographic images create a master virtual replication of the facility that includes both a LIDAR data set and a visual image associated therewith and thereby create a plurality of master visual replications for a given facility;

viewing and observing at least one of the plurality of master visual replications to do one of the following: plan a new interior layout for a facility; determine if a given surface area or volume of the facility is sufficient to receive a new piece of equipment; determine if an existing piece of equipment is installed correctly and correctly positioned; plan a proposed revised layout and reconstruction plan for the facility by placing representations of new equipment into a space and reviewing utilities available at the facility and accessible in the space and utilities that may be needed to be added; or review existing equipment to determine what part is needed prior to dispatching a repair person to the facility; and remodeling the facility based on the plurality of master visual replications; reconstructing the facility based on the plurality of mater visual replications; providing safety inspections and changes based on the plurality of master visual replications; or replacing a piece of machinery within the facility based on the plurality of master visual replications.

18. The method of claim 17, wherein the method further comprises the step of conducting an overhead LIDAR scan of the facility and a surrounding external property and systems to form a composite outside LIDAR image and combing the composite outside LIDAR image and a LIDAR scanned map image of the interior of the facility to form an overall composite mapped image of the interior and exterior of the facility and associated property and using the overall composite mapped image to determine if expansion of the facility is possible or needed for a given remodel planned using the plurality of master visual replications.

19. The method of claim 18, wherein the step of producing an overhead LIDAR image comprising using a drone aircraft to fly over the facility and the property to capture the overhead LIDAR image.

20. The method of claim 17, wherein a remote user may use a remote computing device having embedded viewing software to remotely view and manipulate a composite image of the LIDAR scans and the photographic images to determine a distance measurement, a surface area measurement, or a volume measurement of any given portion of the facility that has been scanned while simultaneously viewing the photographic image of the portion of the facility being measured.

* * * * *